United States Patent [19]

Takada

[11] Patent Number: 5,035,309
[45] Date of Patent: Jul. 30, 1991

[54] ROLLING-CONTACT BEARING TYPE CLUTCH

[76] Inventor: Nobuo Takada, 965-17, Kurotani, Yao-shi, Osaka, Japan

[21] Appl. No.: 509,668

[22] Filed: Apr. 16, 1990

[30] Foreign Application Priority Data

May 8, 1989 [JP] Japan ................................. 1-113621
Dec. 20, 1989 [JP] Japan ................................. 1-328418

[51] Int. Cl.$^5$ ..................... F16D 23/00; F16D 41/06; F16D 43/14
[52] U.S. Cl. ................................. 192/45; 192/41 R; 384/568
[58] Field of Search ............... 192/41 R, 45; 384/568

[56] References Cited

U.S. PATENT DOCUMENTS

| | | | |
|---|---|---|---|
| 1,469,991 | 10/1923 | Armstrong | 384/568 |
| 1,670,197 | 5/1928 | Humfrey | 192/45 |
| 1,834,843 | 12/1931 | Humfrey | 192/45 |
| 3,008,559 | 11/1961 | Förster | 192/45 |
| 3,557,921 | 1/1971 | Takada | 192/45 |
| 3,800,927 | 4/1974 | Takada | 192/45 |
| 4,705,411 | 11/1987 | Kellstrom | 384/568 |

FOREIGN PATENT DOCUMENTS

| | | | |
|---|---|---|---|
| 190017 | 8/1986 | European Pat. Off. | 192/45 |
| 58-52092 | 11/1983 | Japan . | |
| 52317 | 7/1922 | Sweden | 384/568 |

Primary Examiner—Allan D. Herrmann
Assistant Examiner—Nicholas Whitelaw
Attorney, Agent, or Firm—Jordan and Hamburg

[57] ABSTRACT

The clutch includes inner and outer rotation members which respectively have the inner and outer raceways of mono-hyperboloids of revolution or cylindrical surfaces about the same axis line facing each other to form combined raceways, a plurality of intermediate rotation members of cylindrical shapes disposed slantly at an angle with the axis of the inner and outer rotation members with the raceways so that the surface thereof is in line contact with the raceways, and an energizing member which energizes either the inner rotation member or the outer rotation member in a direction to clutch both the members. Depending on rotational direction, the clutch functions as a free rotating rolling-contact bearing or clutch.

9 Claims, 7 Drawing Sheets

ROLLING-CONTACT BEARING TYPE CLUTCH

FIELD OF THE INVENTION AND RELATED ART STATEMENT

The present invention relates to a rolling-contact bearing type clutch which functions as a one-way clutch rotatable only in one direction.

Figure 14:
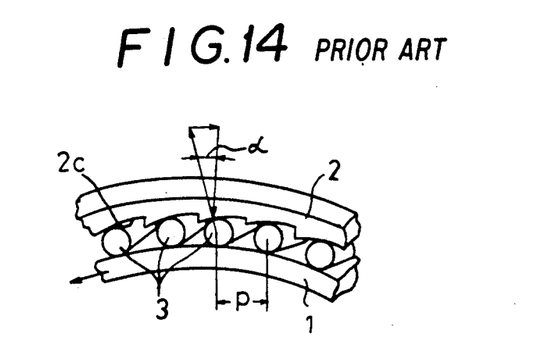
FIG. 14 is a perspective view showing a one-way clutch according to the prior art.

There have been available one-way clutches according to the prior art, for example, as shown in FIG. 14, one-way clutch has cylindrical rollers 3 are arranged in the raceway track between the outer and inner rings 1 and 2, and the inner raceway surface of the outer ring 2 is formed into saw-like cams to bring the inner and outer rings 1 and 2 into clutch condition in reverse rotation by the cylindrical rollers 3 engaged with the cam surface 2c on the outer ring 2. Another one-way clutch wherein both of the raceway surfaces of the inner and outer rings are cylindrical, and cam-like sprags are arranged between the inner and outer rings 1 and 2 in place of the cylindrical rollers of the above example, to have each sprag engaged with the raceway surfaces in reverse rotation by spring force. With the above described clutches according to the prior art, in the reverse rotation (clutch condition) the rollers 3 are fixedly engaged with cam-like inner surface portions 2c of the outer ring 2 which are not circular or uneven in the radial direction, while in the normal rotation (free rotation) the rollers 3 freely slid. However, since the thrust angle must be smaller than the friction angle, formation of a cam within the pitch P of the sprag rollers 3 would restrict the cam height, thus causing a possibility of rollers 3 overriding cam portions 2c and damaging the clutch.

An even and sufficient clutch force in the clutches according to the prior art necessitates a condition where incorporated rollers or sprags are evenly engaged with the cam surface. A limited dimensional accuracy of their components and a limited uniformity of the spring forces previously applied to the rollers in the clutch direction may pose a challenge to the clutches in obtaining uniform clutch forces.

On the other hand, a transmission torque required in the clutch condition necessitates surface pressures proportional to the transmission torque and stable within the tolerance. For this purpose, however, all the rollers must simultaneously participate in the clutch operation without exception, and wedge forces produced by the clutch operation must increase or decrease in the same manner in all the rollers. However, limitations for initial dimensional accuracy of each component, uniformity of relational dimensions between rollers and clutch surface, accuracy of individual cam shapes, as well as deformation and wear of the inner and outer rings associated with forces applied thereto also pose a challenge in maintaining the allowable surface pressure. Particularly, since in the free rotation the clutch must be freely supported with separate bearings, and the rollers must be freely sliding on the cam surface, the wear of the raceway surfaces and sprag rollers also poses a critical challenge to the clutches according to the prior art.

Further, the cams provided in the one-way clutches according to the prior art pose manufacturing difficulties for material, heat treatment and machining accuracy. Such conditions, when calculating Herts' stress in the design of the allowable surface pressure, forces selection of undesirable values of parameters.

To solve these problems, there has been disclosed a one-way clutch (Japanese Patent Publication No. 1983-52092), wherein rollers or sprags are disposed slantly to the raceway generatrix between the inner and outer rings having a shape of conical roller bearing, and both the rings can be freely rotated in one direction while they are clutched in the other direction.

According to the prior art, since the inner and outer rings of the one-way clutch are respectively formed into a conical surface, the rollers may be brought into line contact with either the inner raceway or the outer raceway, but not with both at the same time, thus causing unstable rotation of the rollers, resulting in an extremely high surface pressure of the contact portions which fail to be in line contact.

OBJECT AND SUMMARY OF THE INVENTION

To solve the above described problems, the first to fourth inventions provide rolling-contact bearing type clutches which have smooth free rotation taking advantage of rolling-contact bearing, a high rated loading, an increased service life, and a stable operation in the clutch mode, as well as eliminate the need for supporting bearings.

In addition to the above objectives, the fifth and sixth inventions provide rolling-contact bearing type clutches which further have a simple configuration easy to apply to input/output systems.

In addition to the above objectives described for the first to sixth inventions, the seventh invention a rolling-contact bearing type clutch which has a further enhanced performance in the free rotation.

In addition to the above objectives described for the first to seventh inventions, the eighth and ninth inventions provide rolling-contact bearing type clutches which can be used in an input/output system whose axial displacement cannot be allowed.

To achieve the above objectives, the respective inventions are configured as follows:

A rolling-contact bearing type clutch according to the first embodiment comprises an inner rotation body, an outer rotation body, a plurality of intermediate rotation bodies and energizing means; the inner rotation body being provided with an inner raceway surface of mono-hyperboloid of revolution about one axis line, and the outer rotation body being provided with an outer raceway surface of mono-hyperboloid of revolution about the above axis line; the inner raceway surface and the outer raceway surface facing each other to form a combination of raceways; the intermediate rotation bodies of cylindrical rolling surface being disposed in the circumferential direction of the raceways with their center axes slanting at a predetermined angle to a section including the same axis for the inner and outer rotation bodies, the surface of each intermediate rotation body being in line contact with the inner and outer raceway surfaces, the energizing means energizing either the inner rotation body or the outer rotation body in the axis line direction to narrow the distance of the raceways, and the inner or outer rotation body being provided with an annular member which brings the movement of the intermediate rotation bodies in the axis line direction to widen the distance of the raceways to a stop.

A rolling-contact bearing type clutch according to the second embodiment comprises an inner rotation body, an outer rotation body, a plurality of intermediate rotation bodies and energizing means; the inner rotation body being provided with an inner raceway surface of mono-hyperboloid of revolution about one axis line, and the outer rotation body being provided with an outer raceway surface of mono-hyperboloid of revolution about the above axis line; the inner raceway surface and the outer raceway surface facing each other to form a combination of raceways; the intermediate rotation bodies of conical rolling surface being disposed in the circumferential direction of the raceways with their center axes slanting at a predetermined angle to a section including the same axis for the inner and outer rotation bodies, the surface of each intermediate rotation body being in line contact with the inner and outer raceway surfaces, the energizing means pushing the intermediate rotation bodies from the large diameter side to the small diameter side of the intermediate rotation bodies, and the inner or outer rotation body being provided with an annular member which brings the movement of the intermediate rotation bodies in the axis line direction to a stop and guides rolling of the intermediate rotation bodies at the large diameter side.

A rolling-contact bearing type clutch according to the third embodiment comprises an inner rotation body, an outer rotation body, a plurality of intermediate rotation bodies and energizing means; the inner rotation body being provided with an inner raceway surface of cylinder about one axis line, and the outer rotation body being provided with an outer raceway surface of a combined curved surface of a mono-hyperboloid of revolution and an ellipsoid of revolution about the above axis line; the inner raceway surface and the outer raceway surface facing each other to form a combination of raceways; the intermediate rotation bodies of hourglass-shaped rolling surface formed with a partial curve of ellipse rotated about the center axis thereof and with the radial section gradually increased from one end to the other end being disposed in the circumferential direction of the raceways with their center axes slanting at a predetermined angle to a section including the same axis for the inner and outer rotation bodies, the surface of each intermediate rotation body being in line contact with the inner and outer raceway surfaces, the energizing means pushing the intermediate rotation bodies from the other end side to the one end side of the intermediate rotation bodies, and the inner or outer rotation body being provided with an annular member which brings the movement of the intermediate rotation bodies in the axis line direction to a stop and guides rolling of the intermediate rotation bodies at the other end.

A rolling-contact bearing type clutch according to the fourth embodiment comprises an inner rotation body, an outer rotation body, a plurality of intermediate rotation bodies and energizing means; the outer rotation body being provided with an outer raceway surface of cylinder about one axis line, and the inner rotation body being provided with an inner raceway surface of a combined curved surface of a mono-hyperboloid of revolution and an ellipsoid of revolution about the above axis line; the inner raceway surface and the outer raceway surface facing each other to form a combination of raceways; the intermediate rotation bodies of convex drum-shaped rolling surface formed with a partial curve of ellipse rotated about the center axis thereof and with the radial section gradually increased from one end to the other end being disposed in the circumferential direction of the raceways with their center axes slanting at a predetermined angle to a section including the same axis for the inner and outer rotation bodies, the surface of each intermediate rotation body being in line contact with the inner and outer raceway surfaces, the energizing means pushing the intermediate rotation bodies from the other end side to the one end side thereof, and the inner or outer rotation body being provided with an annular member which brings the movement of the intermediate rotation bodies in the axis line direction to a stop and guides rolling of the intermediate rotation bodies at the other end side.

With the rolling-contact bearing type clutch according to the first to fourth embodiments, the line contact of the intermediate rotation bodies with the inner and outer raceway surfaces will provide a uniform load distribution, and an excellent rolling in the free rotation while a sufficient clutch force due to the wedge effect of the rotation bodies in the reverse rotation. An automatic alignment force applied to the intermediate rotation bodies can ensure a uniform load distribution for a change in various conditions of the clutch such as deformation, wear and variations of dimensional accuracy. As a result, the rolling-contact bearing type clutches according to the invention can have a large rated load, a long service life, and a stable operation with smooth free rotation. Further, the clutches function as bearings, thus eliminating the need for additional bearings on the shaft.

A rolling-contact bearing type clutch according to the fifth embodiment is the same as the third invention excepting that a rotation shaft is used in place of the inner rotation body in the third invention.

A rolling-contact bearing type clutch according to the sixth embodiment is the same as the fourth invention excepting that a mechanical element is used in place of the outer rotation body in the fourth invention.

Therefore, with the fifth or sixth embodiment, since the rotation shaft or the mechanical element can be used as the inner or outer rotation body, the configuration of a system including the rolling-contact bearing clutch can be simplified, thus achieving a low cost and a wide application.

A rolling-contact bearing type clutch according to the seventh embodiment is the same as the first to sixth embodiments excepting that each of the intermediate rotation bodies is divided into two or more in the center axis direction. The seventh embodiment can provide an excellent skewness in the fixed raceway, and a reduced rolling resistance, thus enhancing the performance in the free rotation.

A rolling-contact bearing type clutch according to the eighth invention is the same as the first to seventh inventions excepting that: An input/output rotation body is provided to transmit a torque. The input/output rotation body is located at one side of the outer rotation body, and mounted at a predetermined axial position away from the inner rotation body on the same side of the inner rotation body so as to freely rotate relatively to the inner rotation body via a bearing, and is connected to the outer rotation body through torque transmission means for transmitting the torque to the outer rotation body, and the energizing means is provided between the input/output rotation body and the outer rotation body to energize the outer rotation body in the axial direction and to narrow the distance between the raceway surfaces.

A rolling-contact bearing type clutch according to the ninth embodiment is the same as the first to seventh inventions excepting that: An input/output rotation body is provided to transmit a torque. The input/output rotation body is located at one side of the inner rotation body, and mounted at a predetermined axial position away from the outer rotation body on the same side of the outer rotation body so as to freely rotate relatively to the outer rotation body via a bearing, and is connected to the inner rotation body through torque transmission means for transmitting the torque to the inner rotation body, and the energizing means is provided between the input/output rotation body and the inner rotation body to energize the inner rotation body in the axial direction and to narrow the distance between the raceway surfaces.

For each of the rolling-contact bearing type clutches according to the eighth and ninth embodiments, since a freely rotatable input/output rotation body is provided at a predetermined axial distance away from the inner or outer rotation body, and torque transmission means is provided between the input/output rotation body and respective outer and inner rotation body movable in the axial direction, the input side and the output side can be connected without a displacement in the axial direction. As a result, even if an axial displacement of the input-/output sides is not allowed, this rolling-contact bearing type clutches can be used, thus enhancing their versatility.

BRIEF DESCRIPTION OF THE DRAWINGS

In the accompanying drawings, there are shown illustrative embodiments of the invention from which these and other of its objectives, novel features and advantages will be readily apparent.

In the drawings.

DETAILED DESCRIPTION OF THE PREFERRED EMBODIMENTS

Figures 1, 2, 3:
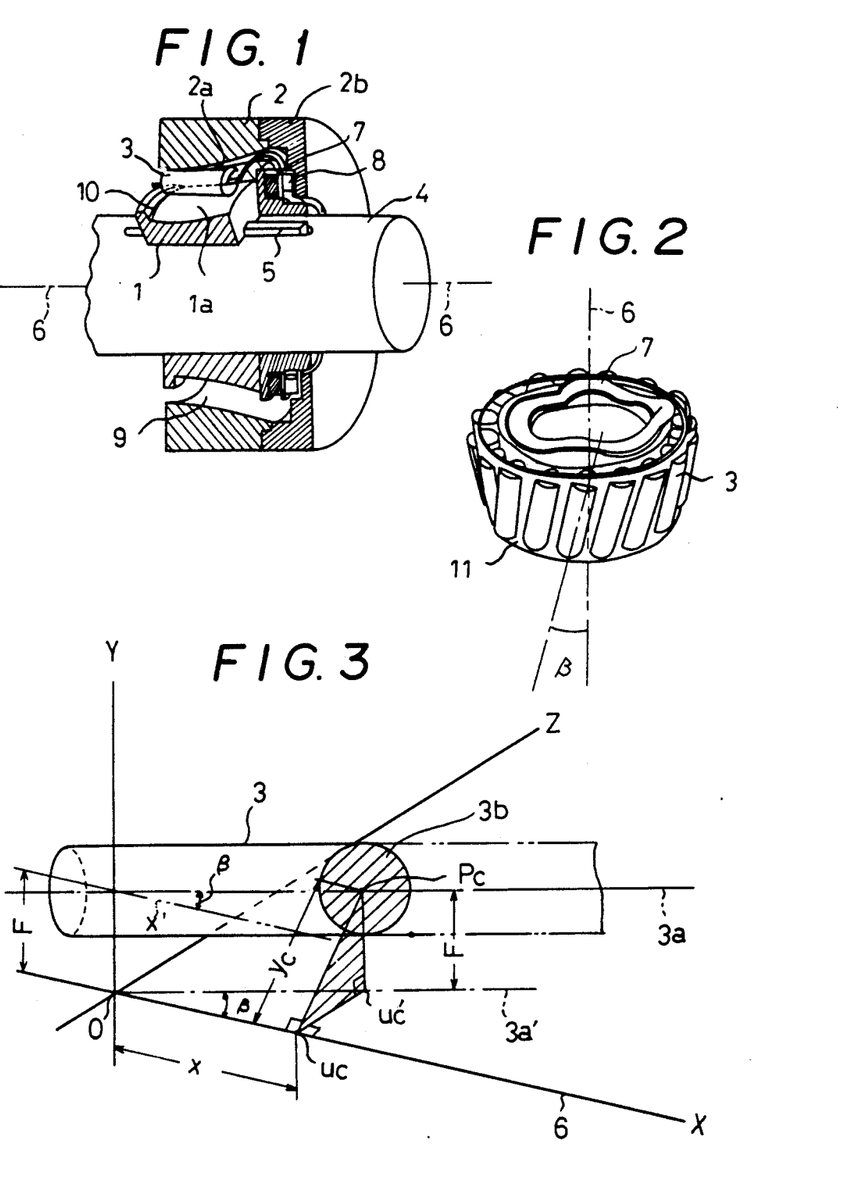
FIG. 1 is a perspective view showing a rolling-contact bearing type clutch according to the present invention.
FIG. 2 is a perspective view showing the rollers and internal parts of the embodiment in FIG. 1.
FIGS. 3 to 5 are explanatory drawings to determine the raceway surface shapes.

FIG. 1 is a view showing a rolling-contact bearing type clutch according to the present invention, and FIG. 2 is a perspective view showing the rollers and internal parts of the embodiment in FIG. 1:

An inner ring 1 corresponding to the inner rotation body in the previous description is mounted on a shaft 4 movably by a key engagement 5. An outer ring 2 corresponding to the outer rotation body is disposed facing the inner ring 1 to form a combination of raceways 9.

A plurality of rollers 3 corresponding to the intermediate rotation body are, as shown in FIG. 2, disposed between the raceways 9 slanting to a plane including a center shaft 6 (axis line) of the inner ring 1 at angle of $\beta$ (e.g., 15 degree).

The inner ring 1 is pushed by the outer ring 2 via a combination of a plate spring 7 and a spring retainer ring 8 corresponding to the energizing means, to a direction to narrow the space of the raceways 9 (from right to left in the drawing). A flange 10 corresponding to the ring member which brings the movement of the rollers 3 in the axial direction to widen the distance of the raceways 9 to a stop is formed on the inner ring 1 at the end thereof.

As configured above, in the free rotation condition (clockwise or right rotation of the shaft 4 and the inner ring 1 viewing from the right end side in the drawing), the rollers 3 will rotate to the left to advance the inner ring 1 to the right direction against an energizing force of the plate spring 7 while guided by the outer ring raceway surface 2a to enlarge the space of the raceways 9. In other words, an action of tapered screw will be produced between the inner and outer rings 1 and 2 via the rollers 3. The action will cause a right direction advancement of the inner ring 1 relative to the outer ring 2 based on the principle of the screw advancement to enlarge the space of the raceways 9. As a result, the inner ring 1 can be freely rotated without causing a wedge action of the rollers 3 between the raceways 9. It should be noted that the flange 10 is disposed at the end of the inner ring 1 to prevent the rollers 3 from advancing the inner ring 1 too far in the right direction and from disengaging from the inner ring 1 in the left direction.

On the other hand, in the reverse rotation condition (the shaft 4 rotates counterclockwise viewing from right) the movement of the components will be contrary to the above description: the rollers 3 will rotate to the right not to advance but to retreat the inner ring 1 to the left direction. The compression force of the plate spring 7 will move the inner ring 1 to the left relative to the outer ring 2 to narrow the space of the raceways 9. The action will cause the rollers 3 to be locked between the raceways 9 to produce a wedge effect. As a result, the inner ring 1 and the outer ring 2 can be clutched as soon as the shaft 1 starts the reversal rotation.

In this connection, the pushing portion 2b at the right end side of the outer ring 2 may be connected to the outer ring 2 itself, and further two pieces of the rolling-contact bearing type clutches may be arranged facing each other to make two or more rows.

In the embodiment in FIG. 1, the inner ring 1 is movable in the axial direction. Alternatively, the inner ring 1 may be fixed and the outer ring 2 may be movable.

Further, a thrust bearing mounted in place of the spring retainer ring 8 portion can have a further enhanced free rotation.

In FIG. 2, rollers 3 are arranged on the inner ring 1 slanting to a section including the axis 6 thereof by an angle of $\beta$, and the rollers 3 is retained in place by a retainer 11 to keep off one another. This configuration can prevent adjacent rollers 3 rotating in a same direction from running against each other with a relative tangential speed in an opposite direction, resulting in a smooth rotation of the rollers 3 and a smooth revolution thereof around the inner ring 1.

Figure 4:
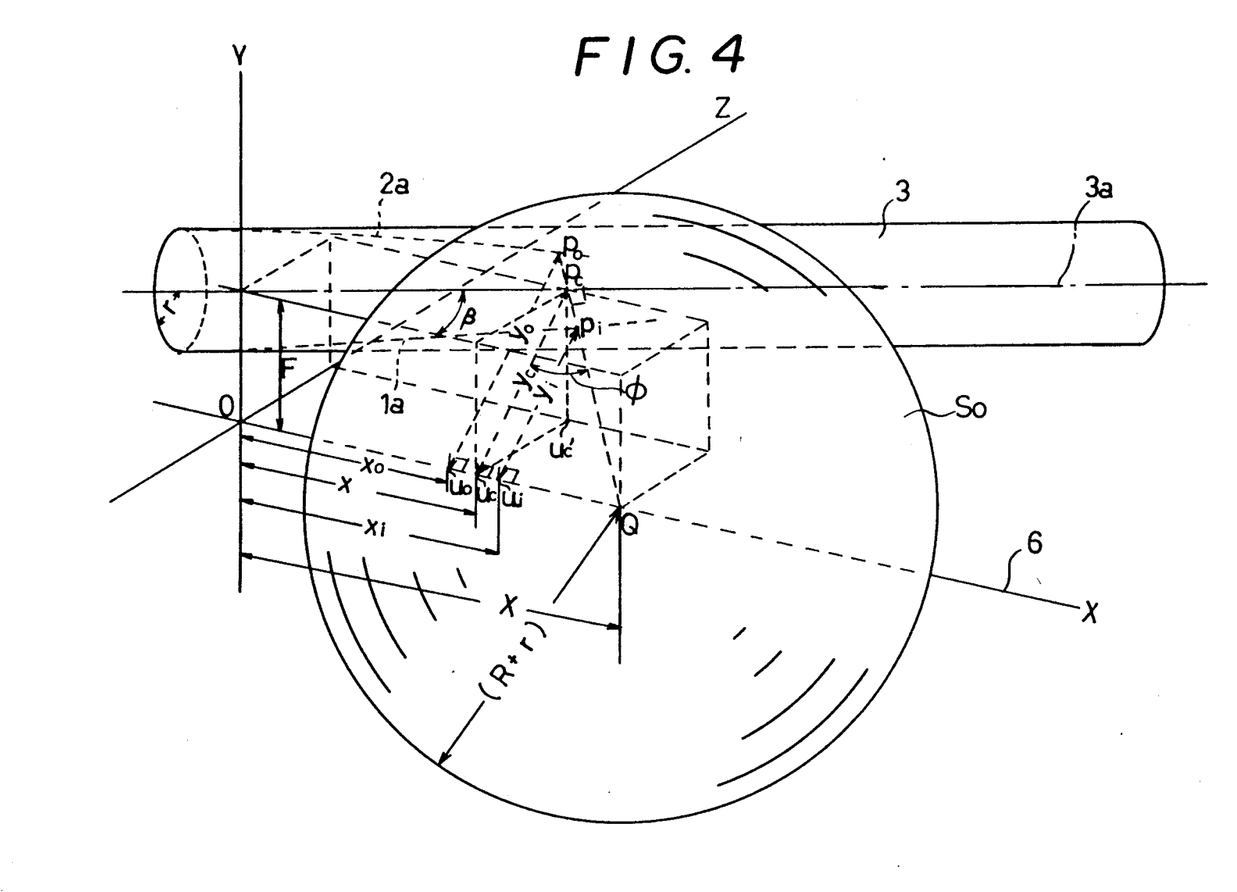
Figure 5:
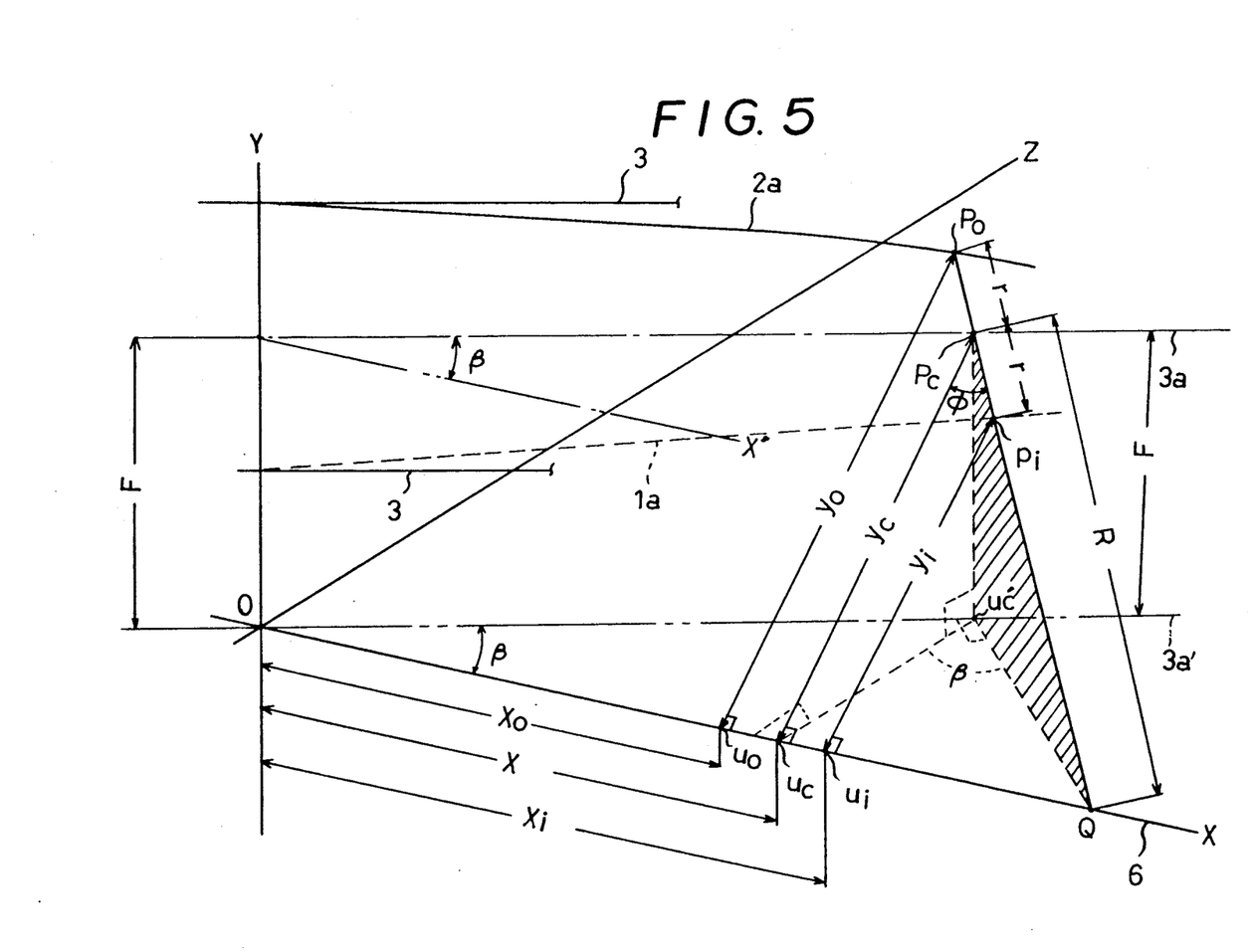

Now, the shapes of the inner and outer raceway surfaces 1a and 2a required for a line contact of the rollers 3 with the inner and outer rings 1 and 2 will be described:

FIGS. 3 to 5 are explanatory drawings to determine the raceway surface shapes in a case of cylindrical rollers 3;

FIG. 3 is a perspective view of X-Y-Z coordinates, in which a roller 3 is so placed that the axis 3a passes through the Y axis a distance F away from the origin O, parallel to the X-Z plane, slanting to the X-Y plane at an angle $\beta$. The X axis represents the common axis 6 of the inner and outer rings 1 and 2. The section $3b$ of the roller 3 shows a section of the roller 3 cut by a parallel plane to the X-Z plane passing the X axis at an arbitrary position x. Points Uc and U'c are respectively intersections with the X axis and the X-Z plane of the perpendiculars from the center Pc of the cross section to the X axis and the X-Z plane. The line $3a'$ passing the origin O and the point U'c is a projected line of the roller axis $3a$ to the X-Z plane, forming an angle $\beta$ with the X axis. Apparently referring to FIG. 3, $$UcU'c = x \tan \beta$$
$$PcU'c = F$$

Therefore, designating a distance from the rotation axis 6 of the rings (i.e., X axis) to the center Pc of the roller 3 as $\overline{PcUc} = yc$, $$yc^2 = F^2 + (x \tan \beta)^2$$

Accordingly, $$yc^2/F^2 - x^2/(F/\tan \beta)^2 = 1 \qquad (1)$$

Since the equation (1) describes a hyperbola, the axis line of the roller 3, that is, the center line of the raceway formed with the inner and outer rings 1 and 2 is hyperbolic with respect to the rotation axis 6 of the rings.

FIG. 4 is a drawing explaining how the rings 1 and 2 come into contact with the roller 3 arranged as above.

Designate as Q an intersection of the X axis with a plane which passes the center Pc of the roller 3 at right angle with the axis $3a$ of the roller 3. Considering spheres Si and So (So in FIG. 4) having the same center of Q which are respectively inscribed and circumscribed to the roller 3, contact points Pi and Po of the roller 3 with the spheres Si and So would be on a perpendicular $\overline{QPc}$, respectively the radius r of the roller 3 apart from point Pc. Therefore, designating $\overline{QPc}$ as R, the radii of the spheres Si and So are respectively $(R-r)$ and $(R+r)$.

Designating as Ui and Uo the intersections of planes passing the points Pi and Po and parallel to the Y-Z planes with the X axis (see FIG. 5), $\overline{PiUi}$ and $\overline{PoUo}$ are respectively distances from the points Pi and Po to the X axis, and distances $\overline{OUi}$ and $\overline{OUo}$ from the origin point O are respectively the X axis coordinates of the points Pi and Po. Therefore, designating $\overline{OUi}$, $\overline{OUo}$, $\overline{PiUi}$ and $\overline{PoUo}$ as xi, xo, yi and yo, functions F (xi, yi) and F (xo, yo) represent the curved surface shape of the raceways $1a$ and $2a$ of the inner and outer rings.

FIG. 5 is an enlarged view showing related portions to determine this relation.

Since $\overline{QPc}$ (equal to R) is at right angle with the center axis $3a$ of the roller 3, and the point U'c is an intersection of a perpendicular from the point Pc to the X-Z plane therewith, U'cQ is at right angle with the axis $3a'$. Therefore, $$OQ = (x/\cos \beta)/\cos \beta = x/\cos^2\beta$$
$$R^2 = F^2 + \{(x/\cos^2\beta) \sin \beta\}^2$$
$$= F^2 + X^2 \tan^2 \beta/\cos^2\beta$$

Then, designating an angle $\angle QPcUc$ as $\phi$, since $\Delta QPcUc$ is a right triangle, $$\cos\phi = \frac{yc}{R} = \frac{\sqrt{F^2 + X^2\tan^2\beta}}{\sqrt{F^2 + X^2\tan^2\beta/\cos^2\beta}}$$

$$\sin\phi = \frac{UcQ}{R} = \frac{X\tan^2\beta}{\sqrt{F^2 + X^2\tan^2\beta/\cos^2\beta}}$$

On the other hand, $\overline{PcPi}$ and $\overline{PcPo}$ equal r, and $\Delta QPiUi$ and $\Delta QPoUo$ are similar to $\Delta QPcUc$, $$xi = x + r\sin\phi = x + xr\frac{\tan^2\beta}{\sqrt{F^2 + X^2\tan^2\beta/\cos^2\beta}} \qquad (2)$$

$$xo = x - r\sin\phi = x - xr\frac{\tan^2\beta}{\sqrt{F^2 + X^2\tan^2\beta/\cos^2\beta}} \qquad (3)$$

$$yi = yc - r\cos\phi = \qquad (4)$$

$$\sqrt{F^2 + X^2\tan^2\beta}\left(1 - \frac{r}{\sqrt{F^2 + X^2\tan^2\beta/\cos^2\beta}}\right)$$

$$yo = yc + r\cos\phi = \qquad (5)$$

$$\sqrt{F^2 + X^2\tan^2\beta}\left(1 + \frac{r}{\sqrt{F^2 + X^2\tan^2\beta/\cos^2\beta}}\right)$$

And, from the above equations, F (xi, yi) and F (xo, yo) are introduced as follows:

$$yi = \frac{\sqrt{F^2 + X^2\tan^2\beta}\left(1 - \frac{r}{\sqrt{F^2 + X^2\tan^2\beta/\cos^2\beta}}\right)}{x\left(1 + \frac{r\tan^2\beta}{\sqrt{F^2 + X^2\tan^2\beta/\cos^2\beta}}\right)} xi$$

$$yo = \frac{\sqrt{F^2 + X^2\tan^2\beta}\left(1 + \frac{r}{\sqrt{F^2 + X^2\tan^2\beta/\cos^2\beta}}\right)}{x\left(1 - \frac{r\tan^2\beta}{\sqrt{F^2 + X^2\tan^2\beta/\cos^2\beta}}\right)} xo$$

These equations express only that the inner and outer ring raceways $1a$ and $2a$ have shapes of quadratic curved surfaces. Obtaining ratios of $xi-x/yi-yc$ and $xo-x/yo-yc$, from equations (2) to (5), $$\frac{xi - x}{yi - yc} = \frac{r\sin\phi}{-r\cos\phi} = -\frac{x}{yc}\tan^2\beta$$

$$\frac{xo - x}{yo - yc} = \frac{-r\sin\phi}{r\cos\phi} = -\frac{x}{yc}\tan^2\beta$$

Since the relation of x and yc is hyperbolic from the equation (1), and $\tan^2 \beta$ in the above equation is constant, the relation of xi and yi, and xo and yo is hyperbolic. As a result, the inner and outer raceways $1a$ and $2a$ are mono-hyperboloids of revolution about the common center axis 6.

For example, assuming $$yi^2/ai^2 - xi^2/bi^2 = 1$$

$$yo^2/ao^2 - xo^2/bo^2 = 1$$

and F=9, r=1.5, $\beta$=15 degree, ai, bi, ao and bo are respectively calculated to be approximately 7.5, 30.7, 10.5 and 36.2, thus giving inner and outer raceway surfaces numerically as mono-hyperboloids.

Figure 6:
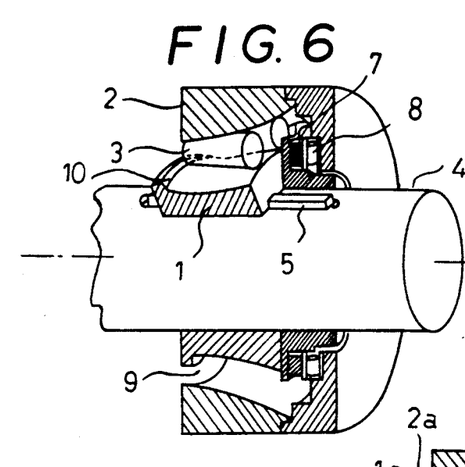
FIGS. 6 to 8 are perspective views showing other embodiments.

FIG. 6 shows an embodiment wherein the cylindrical shape of the roller 3 in FIG. 1 is replaced with a conical shape. Since the generating line of a conical roller is a straight line, the inner and outer raceway surfaces become mono-hyperboloids of revolution similar to those of cylindrical roller. Conical roller-contact bearing type clutches may have similar constructions and functions to those of the cylindrical ones, but the conical one can have a further enhanced rolling.

The conical type embodiment shown in FIG. 6 has a flange 10 at the end of the inner ring 1 to prevent the inner ring 1 from moving out of the inner ring 1 in the axial direction. But, since the conical shape of the roller 3 can generate a wedge action only by a slight movement of the roller 3, the flange 10 may be eliminated when the inner ring 1 is fixed on the shaft in the axial direction. Such conical rolling-contact bearing type clutches may be used in two or more rows.

Figure 7:
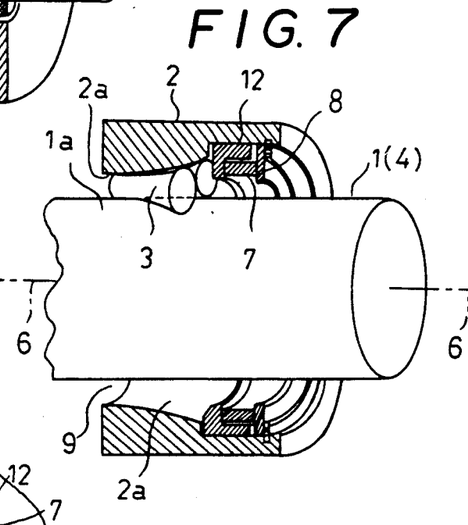
Figure 8:
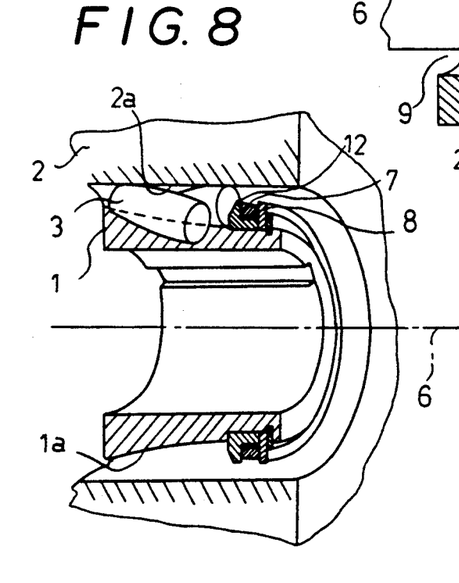

FIGS. 7 to 8 are perspective views showing other embodiments having a cylindrical inner or outer ring raceway surface:

The basic construction and functions of these embodiment are similar to those of the embodiment shown in FIG. 1, thus omitting description of the common features.

Since the embodiments shown in FIGS. 7 and 8 have rollers 3 of hourglass or convex drum shape with sectional areas extended from one end to the other end, even if the inner ring 1 (in FIG. 7, the shaft 4 also serves as the inner ring) and the outer ring 2 do not move in the axial direction, the rollers 3 will advance to right (when the rollers 3 rotate clockwise viewing from the right in the drawing) or retreat to the left due to the rotation of the inner and outer rings 1 and 2, thus providing a free rotation, or clutch action due to the wedge action generated by the rollers 3.

In this case, since the convexed surface of the roller 3 comes into contact with the convexed surface of the inner ring raceway 13, and with the concave inner surface of the outer ring raceway 2a, the surface pressure on the inner ring 1 is higher than the outer ring 2, which produces a larger frictional force, thus causing the roller 3 to be rolled with the inner ring 1 and slid on the raceway 2a of the outer ring 2 to the axial direction. As a result, when the inner ring 1 rotates clockwise viewing from the right, the roller 3 is rotated to the left (retreat), while slipping with respect to the outer ring 2 in the axial direction along the inner ring raceway surface 1a (4a). At the same time, the roller 3 is pressed by the force of the plate spring 7, thus causing the roller 3 to be wedged between the inner and outer raceway surfaces 1a and 2a, thereby placing the inner and outer rings 1 and 2 into clutch condition by the wedge action of the roller 3. Therefore, this embodiment can eliminate the need for a member (flange 10 in FIG. 1) which brings the axial movement of the roller 3 in this direction to a halt.

On the other hand, in the reverse rotation (when the inner ring 1 or the shaft 4 rotates counterclockwise viewing from the right side), the rollers 3 can freely advance without causing wedge action, thus providing a free rotation of the inner and outer rings. In this case to bring the advancement of the roller 3 to a stop, a guide ring 12 is provided to guide the rolling.

Such a rolling-contact bearing type clutch as having a cylindrical inner or outer ring raceway surface can directly use the inner ring for the shaft, or the outer ring for a mechanical element such as gear, pulley and flywheel which needs clutch function and whose inner surface can be used, or a hollow shaft, thus achieving a simplified construction and a low cost as well as an easy installation and a wider application as a clutch.

The inner and outer rings of this type of clutch do not move in their axial directions, thus making the design of a driving system easier. It should be noted that this type of clutch may also be designed to have a similar configuration to the one of the embodiment shown in FIG. 1 in which the inner and outer rings can be moved. In this case, in the free rotation or the clutch condition, the function of the inner and outer rings as tapered screw via the rollers can be also used.

Further, such roller-contact bearing type clutches as described above may be used in two or more rows.

Figure 9:
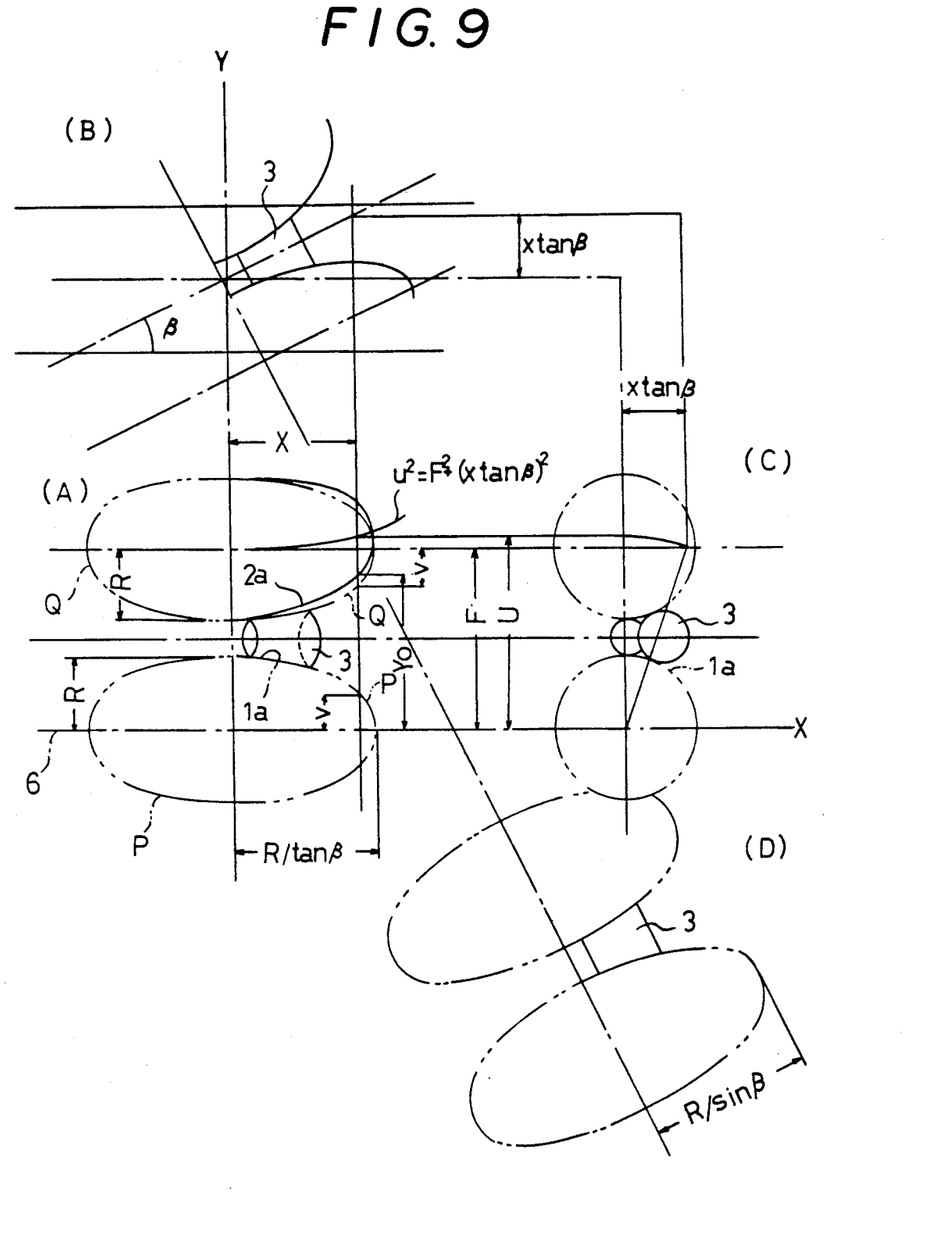
FIGS. 9 and 10 are explanatory drawings to determine the raceway surface shapes.

Now, the shapes of the roller 3 and the outer raceway surface for the cylindrical inner ring raceway surface 1a will be described:

FIG. 9 is an explanatory drawing to determine the outer ring raceway surface shape, and (A) is a front view, (B) a plan view, (C) a side view and (D) is a side view viewing from oblique direction;

To have a roller 3 slanted at an angle of $\beta$ in line contact with the inner ring raceway surface, the line of contact must be an intersecting line on the outer surface of the inner ring 1 when the inner ring 1 is cut by a plane slanted at the angle of $\beta$ from the plane including the axis 6 of the inner ring 1, and the shape of the line is a part of an ellipse. Therefore, the surface shape of the roller 3 becomes like a hourglass which is formed by a rotation of a partial ellipse directing the outside. Designating the radius of the inner ring as R, the minor axis length of the ellipse is R and the major is R/sin $\beta$. When the ellipse is drawn in the front view (A), the major axis length becomes $$(R/\sin \beta) \cdot \cos \beta = R/\tan \beta$$

Therefore, the equation of the ellipse is expressed as follows, placing the center to the origin point;

$$y^2/R^2 + x^2 \tan^2 \beta / R^2 = 1 \tag{6}$$

But, the x and y do not directly express the points on the outer ring raceway surface 2a, but the slant angle $\beta$ of the roller 3 must be considered (compensated) as in the case with the cylindrical roller. Designating the distance between the center line of the ellipse Q drawn at the upper surface of the roller 3 and the shaft line 6 as F, and a compensated value of the center line of the ellipse Q for the slant angle $\beta$ as u, from FIG. 9(C), the following equation (7) is introduced;

$$u^2 = F^2 + (x \tan \beta)^2 \tag{7}$$

In short, the relation of u and x is hyperbolic. The equation (7) with respect of u corresponds to the equation (1) for the cylindrical roller. Therefore, as in the case with the cylindrical roller, a compensation must be made. When an equation which is compensated for u is designated as u', the equation u' is also hyperbolic as described for the cylindrical roller.

Therefore, the shape of the outer ring raceway surface 2a becomes the following, when expressed by a distance yo from the axis line 6;

$$yo = u' - v \qquad (8)$$

The equation (6) expresses an equation for an ellipse Q, same as the ellipse P on the axis line 6. Therefore, from the equation (8), the shape of the outer ring raceway surface 2a becomes a rotation surface about the center axis 6 of a combined curve of hyperbolic y coordinate u' and ellipsoidal y coordinate v, that is, a combined surface of a mono-hyperboloid of revolution and an ellipsoid of revolution.

Figure 10:
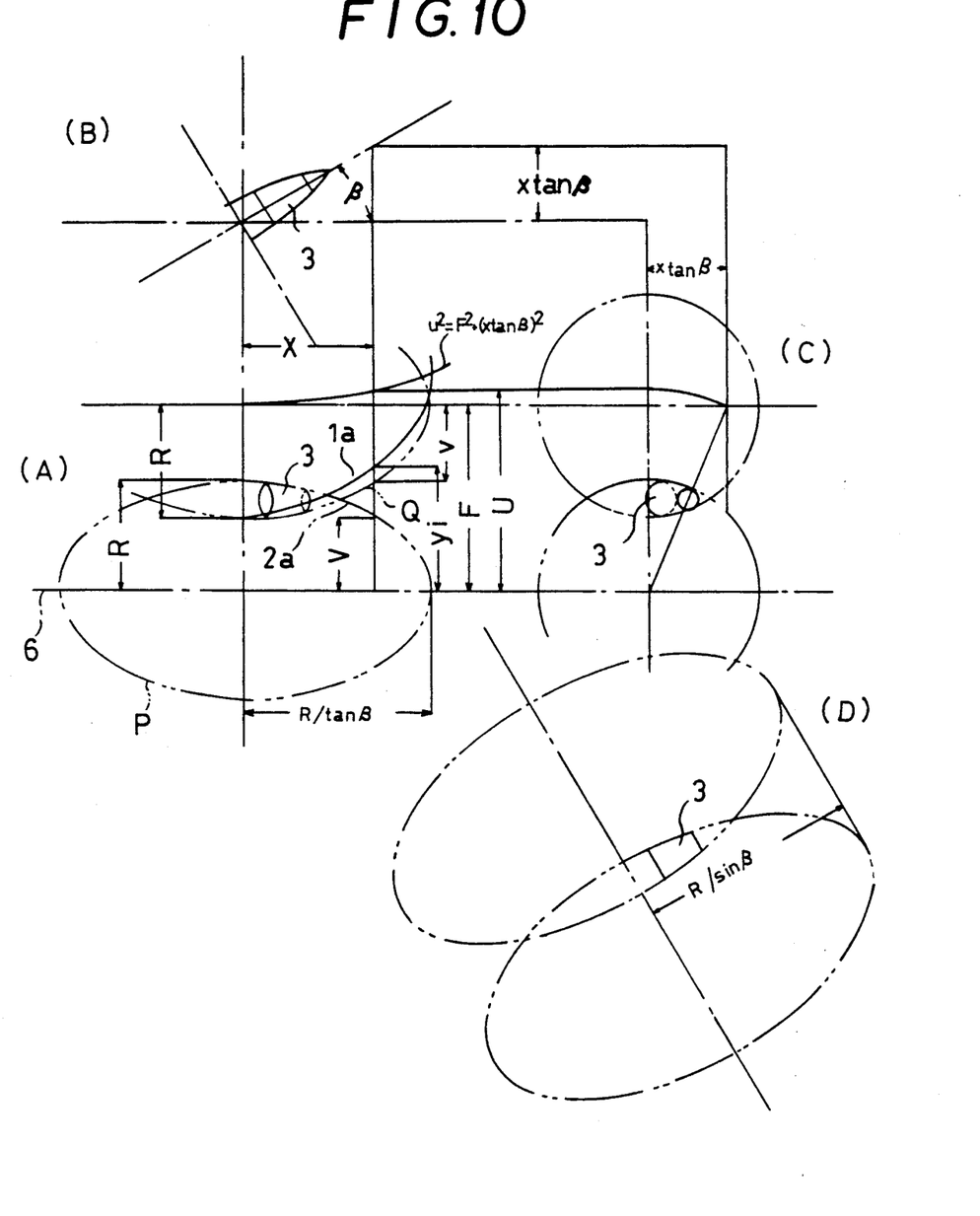

FIG. 10 is an explanatory drawing to determine the inner ring raceway surface shape;

In this case, the inner ring raceway (1a) shape can be determined also in the similar manner to the above described. Thus, the surface shape of the roller 3 becomes a convex drum formed by a revolution of a partial ellipse. The shape of the inner ring raceway surface 1a can be expressed by the following equations:

$$v^2/R^2 + x^2 \tan^2\beta/R^2 = 1$$

$$u^2 = F^2 + (x \tan \beta)^2$$

The equation u' is introduced by compensating the equation u as described above, as follows:

$$yi = u' - v$$

The inner ring raceway surface 1a is a revolution of a combined curve of hyperboloid and ellipse.

The embodiments shown in FIG. 1 and FIGS. 6 to 8 all has a one-piece roller (3) assembly, which may be divided into two or more subassemblies in the axial direction. This arrangement can enhance the performance in the free rotation. More specifically, this type of clutch can reduce rolling resistance, has an enhanced skewness, and increase the adaptability for alignment and machining accuracy.

Figure 11:
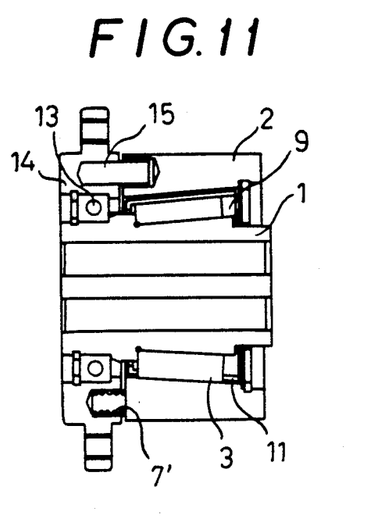
FIGS. 11 to 13 are sectional views showing other embodiments.
Figure 12:
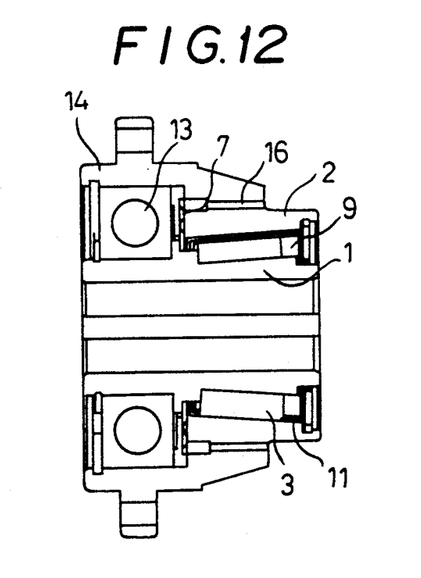

FIGS. 11 and 12 are sectional views showing other embodiments: Rolling-contact bearing type clutches which use cylindrical rollers, and can be used with an input/output side fixed in the axial direction.

A space between the inner and outer rings 1 and 2 forms a raceway 9 for the cylindrical rollers 3 retained therein by a retainer 11.

On the same one-end of the inner and outer rings 1 and 2, an input/output rotation body such as a housing 14 which transmits input torque is disposed via a thrust bearing 13 which functions as the bearing of the clutch. The housing 14 is mounted fixedly to the inner ring 1 in the axial direction and rotatably by the thrust bearing 13 built therein. Further, the housing 14 is so connected to the outer ring 2 as to rotate integrally therewith through a torque transmission pin 15 (FIG. 11), or an involute spline 16 (FIG. 12) or a ball spline (not shown). A precompressed spring such as a coil spring 7' or a plate spring 7 is provided between the housing 14 and the outer ring 2 as energizing means, to apply a pre-force to the outer ring 2.

In using this inner ring 1 or housing 14 as the input side or output side, these embodiments can be generally used as a rolling-contact bearing type clutch when no axial displacement of an input side and output side is allowed.

Figure 13:
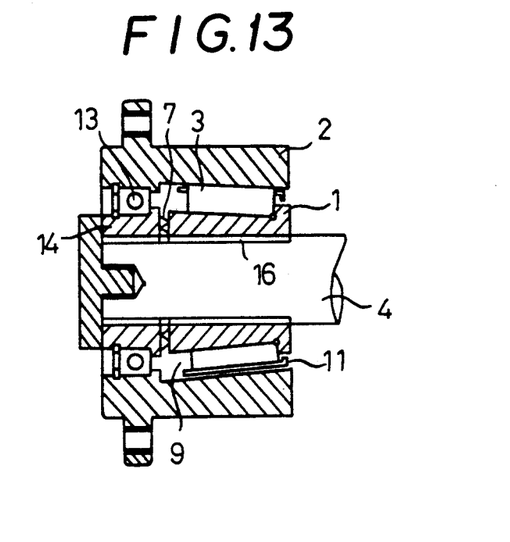

The embodiments shown in FIGS. 11 and 12 shows examples in which the housing is disposed to the outer ring side, but the housing may be connected to the inner ring (1) side through involution spline 16 so that the torque is transmitted to the inner ring 1 as shown in FIG. 13.

As described above, in the rolling-contact bearing type clutch according to the present invention, the rollers are intentionally slanted to the plane including the same axis line 6 of the inner and outer rings, so that, in the relative free rotation between the inner and outer rings, the rollers 3 can rotate maintaining a stable line contact with the inner and outer ring raceway surfaces while maintaining a stable revolution about the same axis of the inner and outer rings, thereby obtaining an excellent load distribution. In this case, even if there should be a dimensional error in rollers 3, or variations in a force previously applied by the plate spring 7 in the start operation, the rollers 3 can change their attitude, so that all the rollers 3 would participate in the carriage of the load, thus achieving an automatically unified load distribution. Therefore, the clutch with a general machining accuracy can realize a calculated load distribution, thus obtaining an even clutch operation.

Further, the rollers 3 functions as a rolling member of a bearing by their rotation and revolution in the free rotation, while as a sprag member of the clutch operation by the action of the energizing means and their automatic aligning action in the reverse rotation (clutch). Therefore, if there should occur a deformation of the inner and outer raceway surfaces or a wear of rollers/raceway surfaces, the inner ring 1 or outer ring 2 or roller 3 may have an axial displacement, but pose no challenge to the clutch operation, thus eliminating the need for addition of the wall thickness of the inner and outer rings to ensure the rigidity for the inner and outer forces or for paying a special preventive consideration for wear, thereby realizing a light weight compact clutch assembly.

Furthermore, the rolling-contact bearing type clutch according to the invention has a circular radial section of the rollers as seen in the general roller bearings, facilitating the calculation of the allowable surface pressure by using the same equation and factors as in the general bearings.

It will be obvious to these skilled in the art that various changes may be made in the invention without departing from the spirit and scope thereof and therefore the invention is not limited by that which is shown in the drawings and described in the specification but only as indicated in the appended claims.

What is claimed is:

1. A rolling-contact bearing type clutch comprising an inner rotation body, an outer rotation body, a plurality of intermediate rotation bodies and energizing means;

said inner rotation body defining an inner raceway surface in the shape of a mono-hyperboloid of revolution about one axis line;

said outer rotation body defining an outer raceway surface in the shape of a mono-hyperboloid of revolution about said axis line;

said inner raceway surface and said outer raceway surface facing each other to form a combination of raceways;

said intermediate rotation bodies having cylindrical rolling surfaces and being disposed in the circumferential direction of said raceways with their center axes slanting at a predetermined angle to a section including said axis of said inner and outer rotation bodies, the surface of each intermediate rotation body being in line contact with said inner and outer raceway surfaces, said energizing means comprising means for energizing either said inner rotation body or said outer rotation body in the direction of said axis line to narrow the spacing of said raceways; and said inner or outer rotation body being provided with an annular member which brings the movement of said intermediate rotation bodies to a stop in the axis line direction to widen the spacing of said raceways.

2. A rolling-contact bearing type clutch as claimed in claim 1 wherein said intermediate rotation body is divided into two or more subassemblies in the central axis direction.

3. A rolling-contact bearing type clutch as claimed in claim 1 wherein an input/output rotation body is provided to transmit the torque, and said input/output rotation body is mounted at a fixed position axially away from said inner rotation body via a bearing at the same one-end sides of said inner and outer rotation bodies and can rotate relatively to each other, and is connected to said outer rotation body by torque transmission means which transmits the torque to said outer rotation body, and said energizing means is provided between said input/output rotation body and said outer rotation body, to energize said outer rotation body to said axial line direction so as to narrow the spacing of said raceways.

4. A rolling-contact bearing type clutch as claimed in claim 1 wherein an input/output rotation body is provided to transmit the torque, and said input/output rotation body is mounted at a fixed position axially away from said outer rotation body via a bearing at the same one-end sides of said inner and outer rotation bodies and can rotate relatively to each other, and is connected to said inner rotation body by torque transmission means which transmits the torque to said inner rotation body, and said energizing means is provided between said input/output rotation body and said inner rotation body, to energize said inner rotation body to said axial line direction so as to narrow the spacing of said raceways.

5. A rolling-contact bearing type clutch comprising an inner rotation body, an outer rotation body, a plurality of intermediate rotation bodies and energizing means;

said inner rotation body defining an inner raceway surface in the shape of a mono-hyperboloid of revolution about one axis line;

said outer rotation body defining an outer raceway surface in the shape of a mono-hyperboloid of revolution about said axis line;

said inner raceway surface and said outer raceway surface facing each other to form a combination of raceways;

said intermediate rotation bodies having conical rolling surfaces and being disposed in the circumferential direction of said raceways with their center axes slanting at a predetermined angle to a section including said axis of said inner and outer rotation bodies, the surface of each intermediate rotation body being in line contact with said inner and outer raceway surfaces, whereby said intermediate rotation bodies have large diameter sides with diameters larger than small diameter sides thereof;

said energizing means comprising means for pushing said intermediate rotation bodies in the direction from the large diameter side to the small diameter side of said intermediate rotation bodies; and said inner or outer rotation body being provided with an annular member which brings the movement of said intermediate rotation bodies in the axis line direction to a stop and guides rolling of said intermediate rotation bodies at the large diameter side thereof.

6. A rolling-contact bearing type clutch comprising an inner rotation body, an outer rotation body, a plurality of intermediate rotation bodies and energizing means;

said inner rotation body defining an inner raceway surface in the shape of a cylinder about one axis line;

said outer rotation body defining an outer raceway surface in the shape of a combined curved surface of a mono-hyperboloid of revolution and an ellipsoid about said axis line;

said inner raceway surface and said outer raceway surface facing each other to form a combination of raceways;

said intermediate rotation bodies having an hourglass shaped rolling surface and being formed with a partial curve of ellipse rotated about the center axis thereof and with the radial section gradually increased from one end to the other end being disposed in the circumferential direction of said raceways with their center axes slanting at a predetermined angle to a section including said axis of said inner and outer rotation bodies, the surface of each intermediate rotation body being in line contact with said inner and outer raceway surfaces, said energizing means comprising means for pushing said rotation bodies in the direction from said other end to said one end of said intermediate rotation bodies; and said inner or outer rotation body being provided with an annular member which brings the movement of said intermediate rotation bodies in the axis line direction to a stop and guides rolling of said intermediate rotation bodies at said other end.

7. A rolling-contact bearing type clutch as claimed in claim 6 wherein said inner rotation body is the rotation shaft.

8. A rolling-contact bearing type clutch comprising an inner rotation body, an outer rotation body, a plurality of intermediate rotation bodies and energizing means;

said outer rotation body defining an outer raceway surface in the shape of a cylinder about one axis line;

said inner rotation body defining an inner raceway surface in the shape of a combined curved surface of a mono-hyperboloid of revolution and an ellipsoid of revolution about said axis line;

said inner raceway surface and said outer raceway surface facing each other to form a combination of raceways;

said intermediate rotation bodies having a convex drum-shaped rolling surface formed with a partial curve of an ellipse rotated about the center axis thereof and with the radial section gradually increased from one end to the other end and being disposed in the circumferential direction of said raceways with their center axes slanting at a predetermined angle to a section including said axis of said inner and outer rotation bodies, the surface of each intermediate rotation body being in line contact with said inner and outer raceway surfaces, said energizing means comprising means for pushing said intermediate rotation bodies in the direction from said other end to said one end thereof; and said inner or outer rotation body being provided with an annular member which brings the movement of said intermediate rotation bodies in the axis line direction to a stop and guides rolling of said intermediate rotation bodies at said other end.

9. A rolling-contact bearing type clutch as claimed in claim 8 wherein said outer rotation body is the mechanical element.

* * * * *